March 3, 1953  N. R. YOUKER  2,629,963
FISHING LURE CARRIER
Filed March 29, 1950
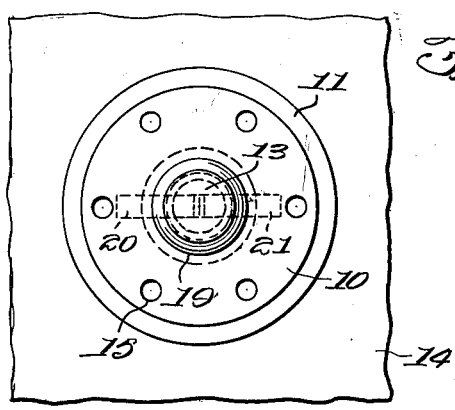
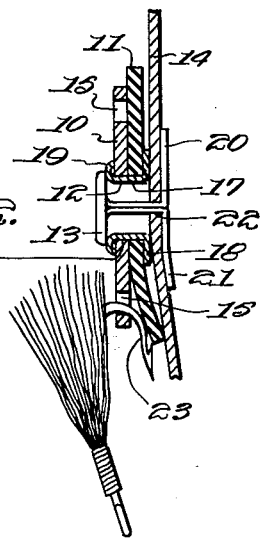
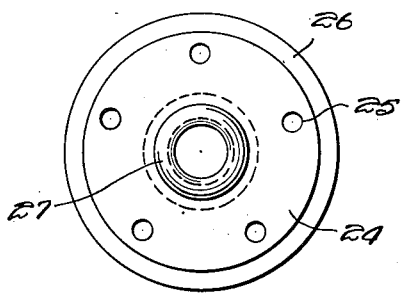
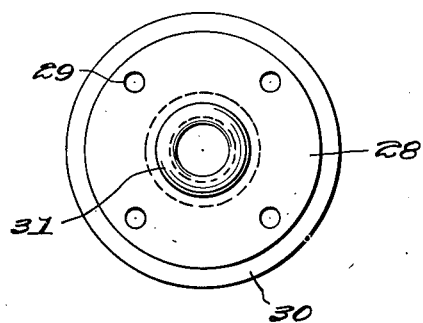
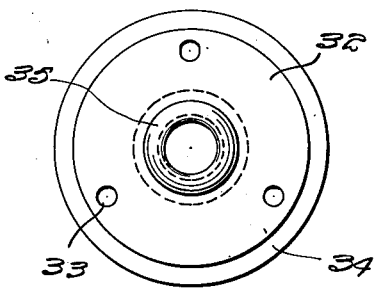
INVENTOR.
Norval R. Youker,
BY Victor J. Evans & Co.
ATTORNEYS Patented Mar. 3, 1953

2,629,963

UNITED STATES PATENT OFFICE 2,629,963

FISHING LURE CARRIER

Norval R. Youker, Chicago, Ill.

Application March 29, 1950, Serial No. 152,716

2 Claims. (Cl. 43—57.5)

This invention relates to fishing tackle and particular carriers for fishing lures, such as flies, streamers, spinners, spinning lures, bugs, plain hooks and small lures, and in particular a carrier in the form of a button having a disc with spaced openings through the outer edge in which fish hooks or lures are held by a resilient washer and in which the disc and washer are secured by an eyelet to the material of a hat, band, belt, or to the material of a garment or the like.

The purpose of this invention is to provide a carrier for a plurality of fishing lures wherein the lures are separated from the usual fishing tackle in a box or the like and wherein each lure is independently removable from the carrier.

Some fishing lures and particularly flies are formed with hairs or buck tails or other perishable material and where these are packed in compartments the fine strands are damaged. With this thought in mind this invention contemplates a fishing lure carrier in the form of a button wherein a plurality of carriers may be attached to the hat of a fisherman and lures may be independently supported therein with the lures separated and positioned to be independently removed and replaced.

The object of this invention is, therefore, to provide means for forming the carrier for fishing lures so that the lures are suspended in spaced relation and independently removable.

Another object of the invention is to provide a carrier for fishing lures that is adapted to hold the usual type of lure and particularly flies without changing the design or construction of the lure.

A further object of the invention is to provide a fishing lure carrier for independently suspending lures on a garment or the like which is of a simple and economical construction.

With these and other objects and advantages in view the invention embodies a button having a disc with hook receiving openings extended therethrough, a rubber washer positioned against the inner surface of the disc, an eyelet upon which the disc and washer are mounted and a clip for mounting the disc and washer through the eyelet upon the material of a garment or the like.

Other features and advantages of the invention will appear from the following description taken in connection with the drawings wherein:

Figure 1 is a front elevational view showing the lure carrier positioned on a garment.

Figure 2 is a cross section through the carrier showing the carrier attached to a garment by a clip having a head with spring fingers.

Figure 3 is a front elevational view similar to that shown in Figure 1 illustrating a disc in which the openings for hooks of lures are spaced for holding lures of a size larger than the lures conveniently suspended in the disc shown in Figure 1.

Figure 4 is a similar view showing a front elevation of the carrier with the openings through the disc spaced further apart for holding lures of larger sizes.

Figure 5 is a similar view showing the openings spaced still further for suspending larger lures.

Referring now to the drawings wherein like reference characters denote corresponding parts the improved fishing lure carrier of this invention includes a disc 10, a washer 11 of rubber or other resilient material, an eyelet 12 upon which the disc and washer are mounted and a clip 13 for securing the carrier to a sheet of material such as the wall of a garment as indicated by the numeral 14.

The disc 10 is provided with a plurality of spaced hook receiving openings 15 and a centrally disposed opening 16 and the eyelet 12 is positioned in the opening 16, as illustrated in Figure 2.

The washer 11, which is formed of rubber, or other flexible or resilient material is provided with a centrally disposed opening 17 through which the eyelet extends and the washer is positioned between the inner surface of the disc and a base flange 18 of the eyelet. The washer and disc are secured on the eyelet by peaning or rolling the outer end of the eyelet over to form a bead 19.

With the parts arranged in this manner the lure carrier, which has the appearance of a button, is attached to a band, belt, or the material of a hat or garment by a clip 13 having a head with fingers 20 and 21 extended therefrom and, as illustrated in Figure 2, the fingers are inserted through an opening 22 in the material of the garment, and bent outwardly against the inner surface of the material.

With the parts mounted in this manner the carrier is rotatable on the clip 13 and the washer 11 resiliently holds hooks and lures as indicated by the numeral 23, in the openings of the disc. By pressing inwardly upon the edge of the washer 11 the lures, held thereby, are released. By this means the lure hooks extended through the openings 15 of the disc 10 are resiliently held in position until the lures are desired and by pressing the washer inwardly or away from the disc the hooks may readily be removed and replaced.

In the design illustrated in Figure 3 a disc 24, similar to the disc 10 is provided with openings 25 that are spaced a greater distance apart than the openings 15 and the disc 24 of this button or carrier is mounted against a resilient washer 26 on an eyelet 27.

In the design shown in Figure 4 a disc 28 having openings 29 therein, which are spaced a still greater distance apart is mounted against a resilient washer 30 on an eyelet 31, and in the design illustrated in Figure 5 a disc 32 having only three openings 33 therein is positioned against a resilient washer 34 on a eyelet 35. The disc may, therefore, be provided with any suitable number of openings, to accommodate lures of different sizes.

It will be understood that other modifications may be made in the design and arrangement of the parts without departing from the spirit of the invention.

What is claimed is:

1. In a fishing lure carrier, the combination which comprises a disc having a centrally disposed opening with a plurality of spaced openings spaced from the outer edge, an eyelet having a base flange on the inner end extended through the centrally disposed opening of the disc and a rubber washer having a centrally disposed opening mounted on the eyelet with the eyelet extended through the opening and with the washer positioned between the base flange of the eyelet and disc, said eyelet having a rolled bead on the outer end for retaining the disc and washer thereon, and mounting means extended through the eyelet, said washer being of greater diameter than said disc.

2. In a fishing lure carrier, a disc, a washer fabricated of resilient material arranged in superposed relation with respect to said disc, said disc being provided with a plurality of spaced hook-receiving openings, there being centrally arranged registering openings in said disc and washer, an eyelet extending through said registering openings and having flanges on each end thereof and a clip having a head on one end thereof and fingers extending from said head through said eyelet, said fingers having a portion thereof bent and adapted to engage a garment and said washer being of greater diameter than said disk.

NORVAL R. YOUKER.

REFERENCES CITED

The following references are of record in the file of this patent:

UNITED STATES PATENTS

| Number | Name | Date |
|---|---|---|
| 76,695 | Barclay | Apr. 14, 1868 |
| 308,569 | McGill | Nov. 25, 1884 |
| 940,132 | Creasey | Nov. 16, 1909 |
| 1,074,077 | Wismer | Sept. 23, 1913 |
| 1,133,542 | Deal | Mar. 30, 1915 |
| 1,623,429 | Martinson | Apr. 5, 1927 |
| 2,065,234 | Martinez | Dec. 22, 1936 |
| 2,248,130 | Smith | July 8, 1941 |
| 2,497,188 | Schindler | Feb. 14, 1950 |